Patented Aug. 30, 1932

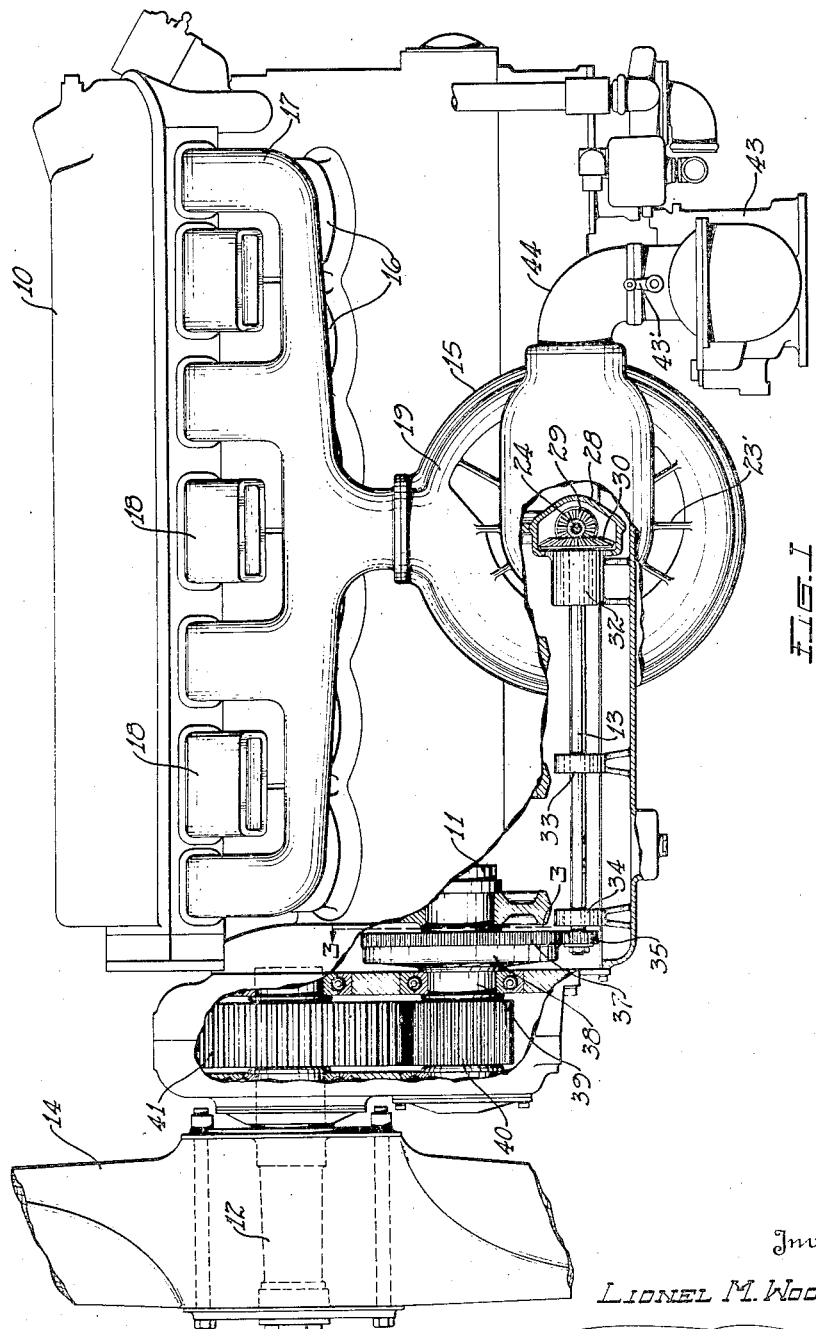

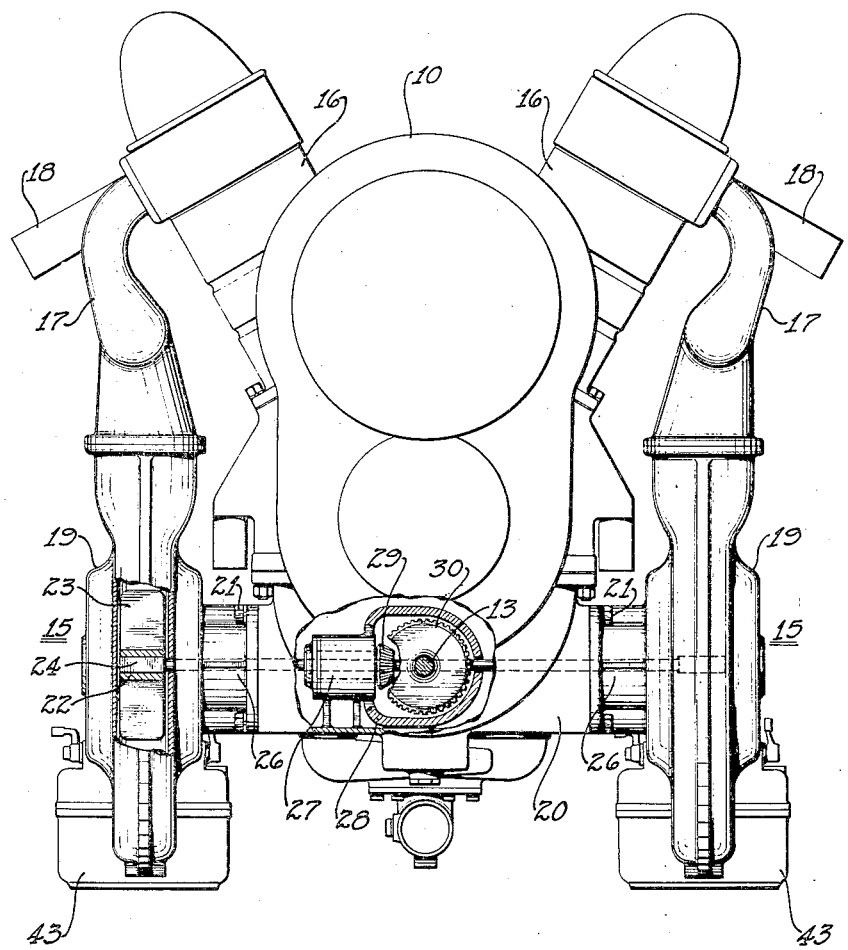

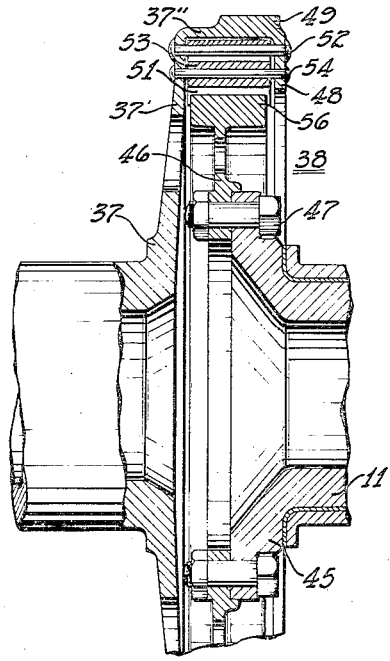
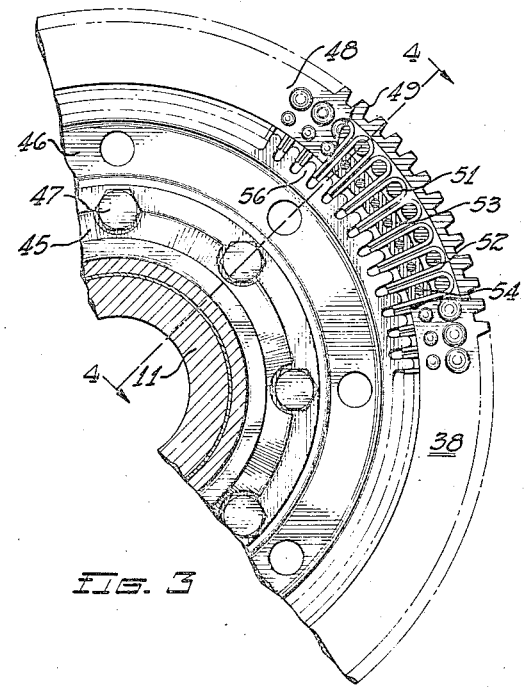
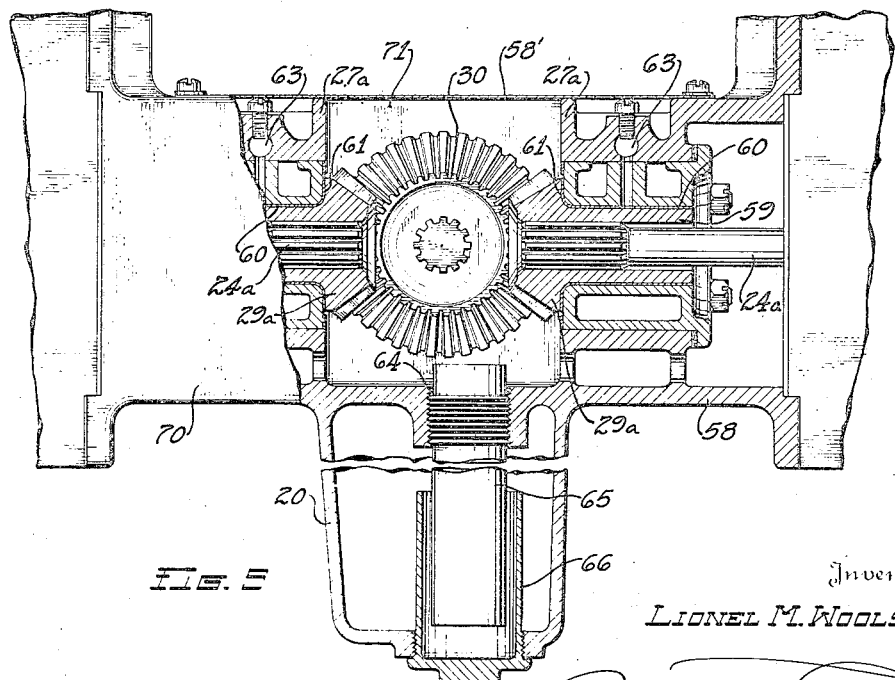

1,874,681

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed February 2, 1927. Serial No. 165,290.

This invention relates to internal combustion engines and more particularly to means for connecting superchargers thereto.

It is now well understood that it is desirable to provide means such as air compressors or superchargers for increasing the weight of air or fuel mixture supplied to the cylinders of internal combustion engines, particularly when such engines are required to operate under varying atmospheric pressures. A conspicuous example where such operating conditions are encountered is in the use of engines on aircraft. It is also found desirable to provide superchargers for engines operating at high speeds such that the normal cylinder suction is ineffective to draw a sufficient volume and weight of fuel and air for optimum power output and efficiency, and hence economy of operation.

Various types of compressors or superchargers have been proposed. One type commonly employed is the centrifugal compressor. In order that air may be supplied by a compressor of this type to the cylinders of an internal combustion engine, it is usually necessary for the compressor to be driven at a speed possibly several times that of the engine crankshaft. Because of the inertia of the moving parts of the superchargers, a serious problem is presented, when an attempt is made to connect the superchargers, by gears or otherwise, directly to the engine crankshaft, because severe strain is placed upon the driving connections at the time of starting the engine. Moreover, as is generally recognized, the crankshaft of an internal combustion engine, when the engine is running, does not rotate at constant speed but periodically increases and decreases in speed or, in other words, oscillates. This oscillation or vibration of the crankshaft tends to introduce further strain in the connections between the shaft and the supercharger. If an airplane propeller is geared or otherwise connected to the engine crankshaft, the same problem presents itself, because the propeller tends to rotate at constant speed, whereas the crankshaft rotates at variable speed. It has been proposed heretofore, to provide a flexible connection between the crankshaft and the propeller of an airplane engine for relieving the strains mentioned. It has also been found that the propeller end of the crankshaft of an airplane engine oscillates with smaller amplitude than the rear end because of the damping effect of the propeller.

It is an object of this invention to increase the weight of air supplied to the cylinders of an internal combustion engine over that supplied by the normal cylinder suction at a given atmospheric pressure.

Another object is to drive an air compressor from the crankshaft of an engine.

An additional object is to yieldingly couple a plurality of propeller shafts to the crankshaft of an engine.

A further object is to balance the weight of superchargers and associated apparatus with respect to the center of gravity of an engine.

A feature of the invention is a means including a yielding coupling for connecting an airplane propeller and a supercharger to the same end of the crankshaft of an internal combustion engine.

Another feature is a driving means for connecting superchargers to the crankshaft of an engine which includes a flexible or resilient drive shaft connected by gears positioned in the engine crankcase.

A further feature is a compartment including a trap adapted to protect the supercharger driving gears from crankcase fumes.

An additional feature is an engine having a plurality of superchargers, carbureters and intake manifolds symmetrically arranged with respect to its center of gravity, whereby the engine is balanced, the space occupied is reduced and its appearance is improved.

The invention generically comprises a driven shaft, normally oscillating when in operation, and a plurality of load devices including propeller shafts, with a flexible coupling device common to the propeller shafts, adapted to connect them to the driving shaft. The invention may be specifically embodied in an internal combustion engine, wherein the crankshaft constitutes the driving shaft of the invention and the shafts connecting an airplane propeller and a pair of superchargers, as load devices, to the crankshaft constitute the propeller shafts of the invention. The compressors may constitute superchargers for increasing the weight of air or fuel mixture supplied to the cylinders.

Other objects and features of the invention will appear from the following description taken in connection with the drawings, which form a part of this specification.

Like reference characters have been used to indicate like parts in the several figures of the drawings wherein:

Fig. 1 is a view in side elevation of an internal combustion engine embodying this invention having a part broken away;

Fig. 2 is a view in front elevation of the engine of Fig. 1, with a part broken away, showing the arrangement of the superchargers and driving shaft therein;

Fig. 3 is a partial view of the flexible coupling element taken on line 3—3 of Fig. 1 with a part of the rim broken away;

Fig. 4 is a view in section on line 4—4 of Fig. 3, and

Fig. 5 is a view in section showing a modification of the driving gears shown in Fig. 1.

In Figs. 1 and 2 an internal combustion engine 10 is shown, including a crankshaft 11 flexibly geared to an airplane propeller shaft 12 and a supercharger propeller shaft 13, for driving the airplane propeller 14 and the superchargers 15, respectively connected thereto.

The engine 10 includes a cylinder block providing a plurality of cylinders 16 having the usual pistons therein and connecting rods, not shown, for driving the crankshaft 11. The cylinders are shown arranged in V-shape, but they may all be arranged in line or in any other desired position. On the outside of each row of cylinders is positioned an intake manifold 17 and an exhaust manifold 18, parts only of the latter being shown. The intake manifold has a plurality of passages communicating with the several combustion chambers in a well known manner. Each intake manifold is connected respectively to the casing 19 of a supercharger 15 whereby the inlet passage of the manifold registers with the outlet port of the supercharger. The superchargers are positioned on opposite sides of the engine and are arranged in balanced relation with respect to the center of gravity of the engine. The casings 19, which are attached to the engine crankcase 20 in any suitable manner as, for example, by means of bolts 21, Fig. 2, are also connected to the respective carbureters 43. The latter are thus adapted to supply fuel mixture, via the superchargers and intake manifolds, to the cylinders.

Each supercharger 15 is illustrated as of the centrifugal type and includes a rotor 22 having a plurality of blades 23 positioned within the casing 19. The casing is provided with vanes 23' for directing the air into the manifold 17.

The rotors 22 are keyed, or otherwise suitably attached, to the ends of a relatively slender and resilient driving shaft 24 extending transversely through oil tight apertures in the sides of the crankcase and through bearings 26 in the supercharger casings 19. The shaft 24 also is supported near its mid point by a bearing 27 mounted within the crankcase and upon a horizontal partition thereof. This bearing has an integral portion 28 adapted to provide a casing for a bevel pinion 29 attached to the shaft 24 adjacent to the inner side of the bearing 27 and for a bevel gear 30 meshing with this pinion. The gear 30 is attached to the supercharger propeller shaft 13, this shaft being mounted lengthwise of the engine, within the crankcase, on the bearings 32, 33 and 34. Shaft 13 is preferably positioned at right angles to the shaft 24 and its forward end is provided with a pinion 35 which meshes with teeth provided on the rim of the outer element 37 of a flexible coupling device 38, having an inner element connected to the crankshaft. The device 38, which will be described in detail later, is adapted to flexibly couple the crankshaft 11 to the propeller shaft 13 for driving the supercharger 15. The outer element 37 of the device 38 also includes an integral shaft 39 upon which is mounted a driving pinion 40 in mesh with a spur gear 41 attached to the airplane propeller shaft 12. The shaft 12 is accordingly flexibly coupled to the crankshaft 11 by the device 38.

The supercharger driving gears may be designed to have ratios such that the rotors 22 thereof are driven at any desired speed but preferably several times the speed of the crankshaft 11, whereby the vanes 23 draw the fuel mixture from the carbureters 43 and force it at increased pressure into the combustion chambers of the engine. The superchargers thus supplement the normal engine suction, in supplying fuel to the cylinders and are of particular advantage in connection with airplane engines, which are often required to operate at high altitudes where the atmosphere is materially rarefied and the engine suction alone is ineffective to supply sufficient weight of air or fuel mixture for maximum power output.

The superchargers are also of advantage when the engine is running at high speed. The speed of rotation of the superchargers is, of course, proportional to the speed of the engine, whereby the air pressure is increased as the engine speed increases.

The carbureters 43 include the usual throttle valves having control arms 43', but the details of their construction do not form a part of this invention and they may be of any well known type.

In Fig. 3 is shown a view of the flexible coupling device 38. This view shows the crankshaft 11 in section. The device 38 includes the inner element 46, which is attached to an integral flange 45 of the crankshaft in any suitable manner, for example, by bolts 47. The outer element 37 includes a circular flanged portion 37' positioned adjacent to and concentrically with the inner element and having an axially extending flange 37", forming a rim, and a radially extending flange 48, forming an annular face. The rim of the element 37 is provided with teeth 49, adapted to mesh with the teeth on the pinion 35 of Fig. 1. Within the annular recess formed by the rim 37" and radial flange 48 of the casing 37, U-shaped resilient members 51 are placed. These members are retained by pins 52, positioned in the crotch thereof and passing through the flanges 37' and 48 and by spacing blocks 53 fastened between the legs by pins 54. The pins 52 and 54 may be fastened to the flanges by riveting or in any other desired manner. The legs of the separate spring members 51 straddle separate teeth 56 of the inner element 46. When the crankshaft 11 starts rotating, a large torque is suddenly applied to the inner element 46 and the resilient members 51 are designed to yield slightly thereby reducing the shock to the connected parts, including the airplane propeller and supercharger propeller shafts and the associated driving gears.

The type of yielding flexible coupling herein described has advantages over ordinary clutch coupling devices, because the former affords a permanent flexible connection between the driving and driven members, having substantially no friction losses, whereas the latter introduce a considerable loss of power by friction and are likely to cause damage by sticking.

The propeller 14 normally tends to rotate at constant speed and accordingly tends to dampen the oscillation of the crankshaft 11, which oscillation occurs principally because of the successive impulses imparted to this shaft by the pistons. Since the crankshaft is somewhat flexible, its rear end will generally oscillate wth greater amplitude than its front end, to which the airplane propeller is attached.

By gearing the supercharger propeller shaft 13 to the flexible coupling element 38, a coupling is effected to the same end of the engine crankshaft as the airplane propeller and to the end which oscillates with the smaller amplitude. The element 38 accordingly provides a common flexible coupling for both the airplane propeller and the supercharger.

The shafts 13 and 24 are preferably constructed with sufficiently small diameter to yield resiliently when the driving torque is applied by the crankshaft in starting, whereby additional flexibility in the driving mechanism is secured. These shafts therefore supplement the flexible coupling 38 in preventing the sudden application of the crankshaft torque to the supercharger. The strain on the supercharger driving gears is thereby reduced, and these gears may have smaller dimensions and less inertia, and require less driving power, than would otherwise be required. This is important, because the rotating elements of the supercharger are driven at exceedingly high speed; the ratio of supercharger to crankshaft speed may be as high as 10 to 1. Because of the high gear ratio the inertia of the rotors and associated gears on the supercharger propeller shafts causes a large reaction such that, without the provision of flexible coupling means, the driving gears would be stripped.

The engine disclosed herein may be adapted for example to develop 1000 H. P. and each of the supercharges may be a 500 H. P. unit. By utilizing separate supercharger units they may be constructed with convenient dimensions and the disabling of one supercharger will not completely disable the engine, because the other supercharger may continue to operate alone. In addition a balanced and compact arrangement of the superchargers is secured, and this is of considerable importance, because on airplanes space is limited and balance is imperative.

In Fig. 5 a modification of the supercharger bevel gears shown in Figs. 1 and 2 is illustrated. The modification consists principally in the provision of two shafts 24a in place of the single shaft 24, and in the provision of separate bevel pinions 29a splined to the shafts 24a in place of the single bevel pinion 29 of Fig. 1. The pinions 29a mesh with the bevel gear 30 and are positioned diametrically opposite each other. The gears 29a and 30 are enclosed in a gas tight casing formed by partitions 58 and 58', bearing brackets 27a and plates 70 and 71, The shanks 59 of the pinions 29a are journaled in separate bearings 60 in the brackets 27a. These bearings not only provide the ordinary cylindrical bearing surfaces 29, but also provide, by their faces, thrust bearing surfaces, which engage the shoulder 61 of the pinions 29a. These pinions are therefore prevented from sliding along the shafts 24a, in one direction, by the bevel gear 30 and, in the opposite direction, by the bearing brackets 27a.

The bearing brackets 27a are provided with oil ducts 63 to which oil under pressure may be supplied for lubricating the bearings, in any well known manner. For carrying off oil that accumulates in the gear case, a hole 64 is provided in the bottom thereof in which a pipe 65 is threaded so as to extend downward therefrom nearly to the bottom of the crankcase. The pipe 65, which projects into a larger pipe 66, closed at its lower end, extending upward from the bottom of the crankcase 20, therefore provides an oil passage. The pipes 65 and 66 hold at all times, a certain amount of oil and hence, function as a trap to prevent fumes produced by combustion from reaching and attacking the gears. It is desirable to exclude the combustion fumes from the gear case because these fumes are found to be injurious to the gears.

In the modification of the supercharger device shown in Figs. 1 and 2, the rotors are driven in the same direction, whereas in the one shown in Fig. 5 the rotors are driven in opposite directions. The operation of the two arrangements is in other respects the same, each including slender resilient shafts and light gears, whereby the shock resisting flexibility of the device is increased.

Although the invention has been described in connection with certain specific embodiments, the principles involved are susceptible of numerous other applications that will readily occur to persons skilled in the art. The invention is therefore to be limited only as indicated by the scope of the appended claims.

What is claimed is:

1. In combination, a driving shaft, an airplane propeller connected to one end of said shaft, a driven shaft, said driven shaft being connected to the same end of said driving shaft as said propeller, and a common flexible coupling between said propeller and driven shaft and said driving shaft.

2. In an internal combustion engine, a crankcase containing fumes, gears in said crankcase, said gears being positioned in a closed compartment and a trap including telescoped tubes adapted to drain oil from said compartment to said crankcase and to exclude fumes from said gears.

3. In combination with an engine crankcase, a gas tight compartment therein, gears included in said compartment, and means for draining oil from said compartment including telescoped conduits one of said conduits having a closed end and being detachably mounted on said crankcase.

4. In an internal combustion engine having a crankshaft and a shaft driven from said crankshaft, flexible coupling means between said shafts, a supercharger for the engine, and a drive shaft for the supercharger geared to and driven from said coupling means.

5. The combination with an internal combustion engine having a driving shaft and a driven shaft, of yielding coupling means between the shafts, an engine accessory having considerable inertia, and flexible driving means between the yielding means and said accessory.

6. In combination, a driving shaft, a propeller, a connection between one end of said shaft and said propeller including a flexible coupling, a driven shaft, and a connection from the driven shaft to the propeller driving end of the driving shaft through said flexible coupling.

7. In combination, a driving shaft, an airplane propeller, a driven shaft, and a common flexible coupling on the driving shaft connecting same with the propeller and with the driven shaft.

8. In an internal combustion engine for aircraft use, a crankshaft subject to oscillatory vibrations, a supercharger drive shaft, relatively light-weight gears connecting the crankshaft with the supercharger drive shaft, the ratio of said gears being such that the supercharger drive shaft is driven at a speed several times that of the crankshaft, and a flexible coupling member between the gears and one of the shafts for absorbing the vibrations emanating from the crankshaft and whereby the employment of said relatively light-weight gears having such a relatively large ratio is possible.

In testimony whereof I affix my signature.

LIONEL M. WOOLSON.